(12) United States Patent
Ambrose et al.

(10) Patent No.: US 10,799,072 B2
(45) Date of Patent: Oct. 13, 2020

(54) STAND MIXER WITH BOWL LIFT

(71) Applicant: Hamilton Beach Brands, Inc., Glen Allen, VA (US)

(72) Inventors: Koen A Ambrose, Glen Allen, VA (US); Benjamin H Branson, III, Maidens, VA (US); Ernest B Pryor, Jr., Maidens, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 279 days.

(21) Appl. No.: 15/952,882

(22) Filed: Apr. 13, 2018

(65) Prior Publication Data

US 2019/0313855 A1    Oct. 17, 2019

(51) Int. Cl.
*B01F 7/16* (2006.01)
*A47J 43/044* (2006.01)
*A47J 43/07* (2006.01)

(52) U.S. Cl.
CPC ....... *A47J 43/0727* (2013.01); *A47J 43/0705* (2013.01); *B01F 7/161* (2013.01); *B01F 7/1605* (2013.01); *A47J 2043/04463* (2013.01); *B01F 2215/0026* (2013.01)

(58) Field of Classification Search
USPC .................. D7/376, 379, 380; 366/197–207
See application file for complete search history.

(56) References Cited

U.S. PATENT DOCUMENTS

| | | | |
|---|---|---|---|
| 1,733,291 A * | 10/1929 | Aastrup | A21C 1/02 366/98 |
| 1,761,237 A | 6/1930 | Schiff | |
| 2,137,547 A | 11/1938 | Snow | |
| 2,662,753 A * | 12/1953 | Schwarz | A47J 43/044 366/200 |
| 4,500,210 A * | 2/1985 | Vilen | B01F 7/1605 366/207 |
| D448,966 S | 10/2001 | Hsieh | |
| 6,367,963 B2 | 4/2002 | Sanpei et al. | |
| 6,410,068 B2 | 6/2002 | Goldston | |
| 6,470,793 B1 | 10/2002 | Vogt | |
| 6,668,704 B1 | 12/2003 | Lassota | |
| 6,991,363 B2 * | 1/2006 | Brunswick | A21C 1/02 366/203 |
| 7,014,354 B2 | 3/2006 | Donthnier et al. | |
| 7,175,338 B2 | 2/2007 | Hooper et al. | |
| 7,950,843 B2 | 5/2011 | Blackburn et al. | |
| 8,251,567 B2 | 8/2012 | Brunswick et al. | |

(Continued)

FOREIGN PATENT DOCUMENTS

GB    2520767 A  *  6/2015  ..........  A47J 43/0727

*Primary Examiner* — Jennifer A Leung
(74) *Attorney, Agent, or Firm* — Alexander D. Raring

(57) ABSTRACT

A stand mixer includes: a base, the base including a bowl lift framework having first lift features; a support arm attached to the base and extending upwardly therefrom; a head attached to an upper end of the support arm and extending generally horizontally therefrom above the base; and a bowl assembly comprising a bowl and a skirt mounted to the bowl, the skirt including second lift features. The first lift features interact with the second lift features such that, when the bowl assembly is rotated relative to the bowl lift framework, the bowl assembly changes elevation relative to the base between raised and lowered positions.

14 Claims, 18 Drawing Sheets

(56) References Cited

U.S. PATENT DOCUMENTS

| | | |
|---|---|---|
| 8,438,968 B2 | 5/2013 | Warner |
| 9,895,024 B2 * | 2/2018 | Pendleton ............. A47J 43/044 |
| 2005/0058018 A1 | 3/2005 | Hooper et al. |
| 2008/0291777 A1 | 11/2008 | Schnipke et al. |
| 2013/0140753 A1 * | 6/2013 | Blagotinsek ........ A47J 43/0705 |
| | | 269/309 |

* cited by examiner

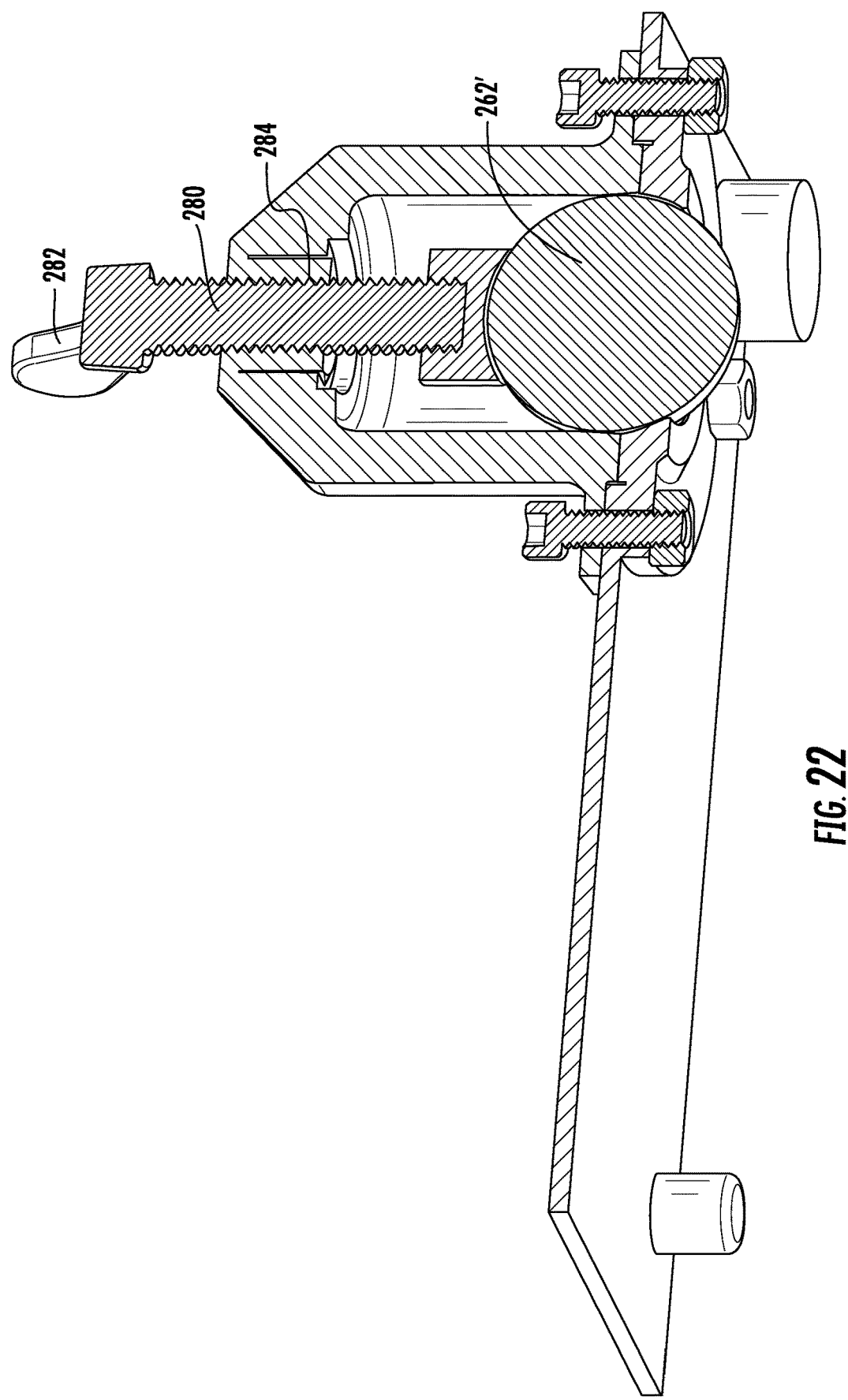

US 10,799,072 B2

STAND MIXER WITH BOWL LIFT

FIELD OF THE DISCLOSURE

The present application is directed generally to mixers, and more particularly to stand mixers.

BACKGROUND

Stand mixers are popular home appliances used for multiple tasks in combining ingredients, such as mixing, creaming, blending, and the like. Stand mixers typically include a base that supports a bowl, an upright support arm that extends upwardly from the base, and a cantilevered "head" that extends horizontally from the upright support on which beaters are mounted. The beaters extend downwardly from the arm into the bowl for use.

Stand mixers employ one of two basic techniques to enable the bowl to be inserted or removed from its position beneath the beaters: tilting heads or bowl lifts. Tilting heads typically locate the motor in the head and use lighter components and less powerful motors. The head tilts via a pivoting mechanism to move the beaters into and out of position. An exemplary tilting head stand mixer is Hamilton Beach Model No. 63325, available from Hamilton Beach Brands (Richmond, Va.).

Bowl lifts are used on stand mixers, in which the head is in a fixed position. The tilt mechanism of a tilt head mixer introduces a loose point for vibration. Bowl lifts generally comprise mechanisms that employ rails, gears, linkages or the like mounted on the support arm. A foundation that supports the bowl from underneath or grips its sides is coupled to the mechanism. A drive mechanism drives the foundation, and therefore the bowl, up and down relative to the base. Exemplary bowl lifts are described in, for example, U.S. Pat. Nos. 1,761,237; 8,251,567; 7,950,843; and 7,014,354 and U.S. Patent Publication No. 2008/0291777, each of which is hereby incorporated herein by reference in its entirety. However, these systems often present cleaning issues (for example, rails and gears may be particularly difficult to clean) and may be aesthetically unpleasing to some consumers.

SUMMARY

As a first aspect, embodiments of the disclosure are directed to a stand mixer comprising: a base, the base including a bowl lift framework having first lift features; a support arm attached to the base and extending upwardly therefrom; a head attached to an upper end of the support arm and extending generally horizontally therefrom above the base; and a bowl assembly comprising a bowl and a skirt mounted to the bowl, the skirt including second lift features. The first lift features interact with the second lift features such that, when the bowl assembly is rotated relative to the bowl lift framework, the bowl assembly changes elevation relative to the base between raised and lowered positions.

As a second aspect, embodiments of the disclosure are directed to a bowl assembly for a stand mixer comprising: a bowl; a skirt mounted to a lower end of the bowl; and a plurality of radially-outwardly projecting nubs mounted on the skirt. Such a bowl assembly may be suitable for use with a stand mixer as described above.

As a third aspect, embodiments of the disclosure are directed to a method of raising a bowl of a stand mixer, comprising: providing a stand mixer having a base, a support arm attached to the base and extending upwardly therefrom, a head attached to an upper end of the support arm and extending generally horizontally therefrom above the base, beaters mounted on the head and extending downwardly therefrom, and a bowl mounted in the base below the beaters; and rotating the bowl relative to the base, wherein features of the bowl interact with features of the base to cause the bowl to change in elevation relative to the base upon such rotation.

As a fourth aspect, embodiments of the disclosure are directed to a stand mixer comprising: a base; a support arm attached to the base and extending upwardly therefrom; a head attached to an upper end of the support arm and extending generally horizontally therefrom above the base; a wheel; and a wheel lowering mechanism mounted to the base and to the wheel. The wheel lowering mechanism is configured to move the wheel between a raised position and a lowered position in which the wheel extends below the base to engage an underlying surface.

BRIEF DESCRIPTION OF THE FIGURES

FIG. 22 is a section view of a retractable wheel mechanism according to alternative embodiments of the disclosure.

DETAILED DESCRIPTION

Figure 1:
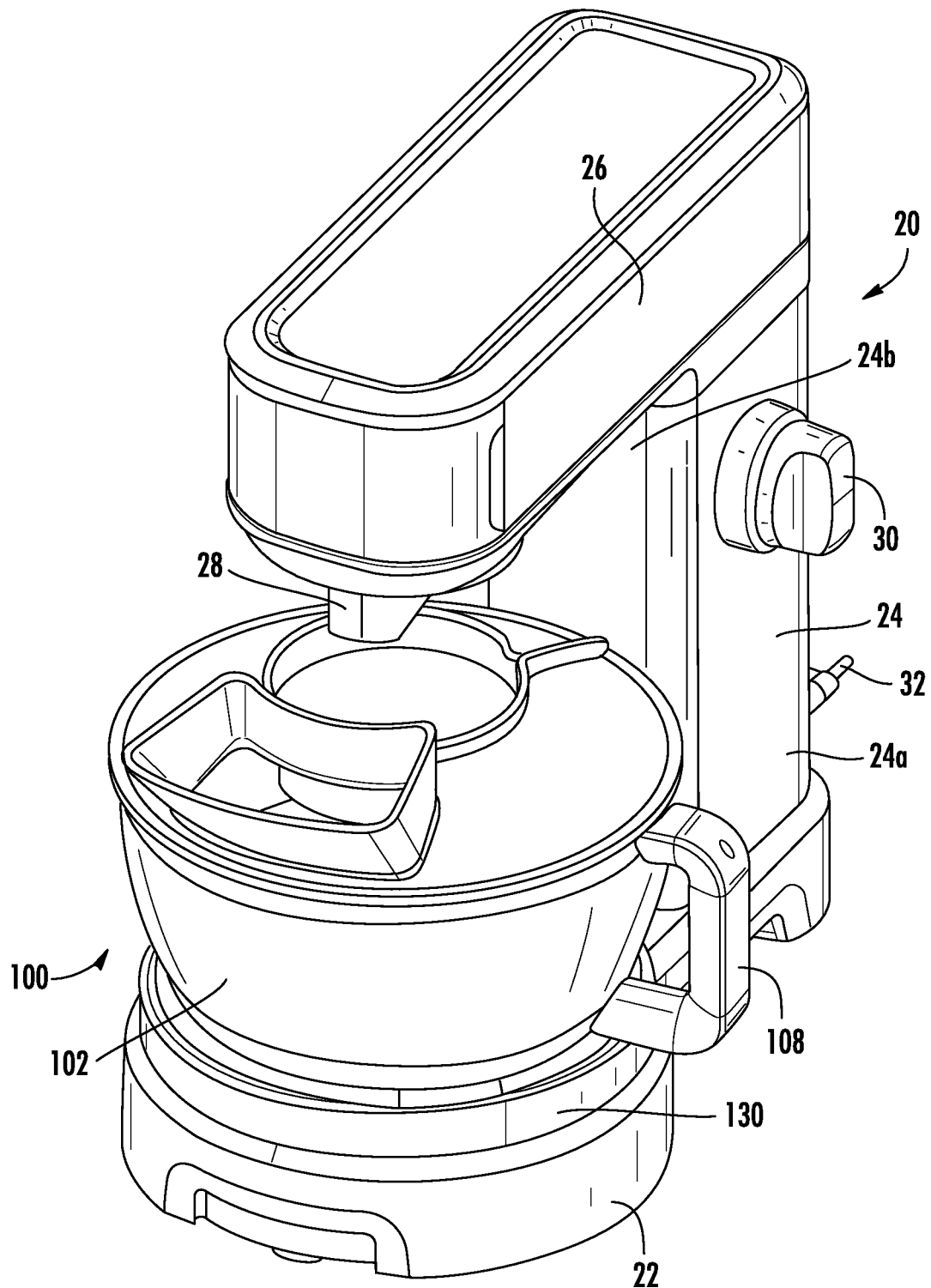
FIG. 1 is a perspective view of a stand mixer according to embodiments of the disclosure.
Figure 2:
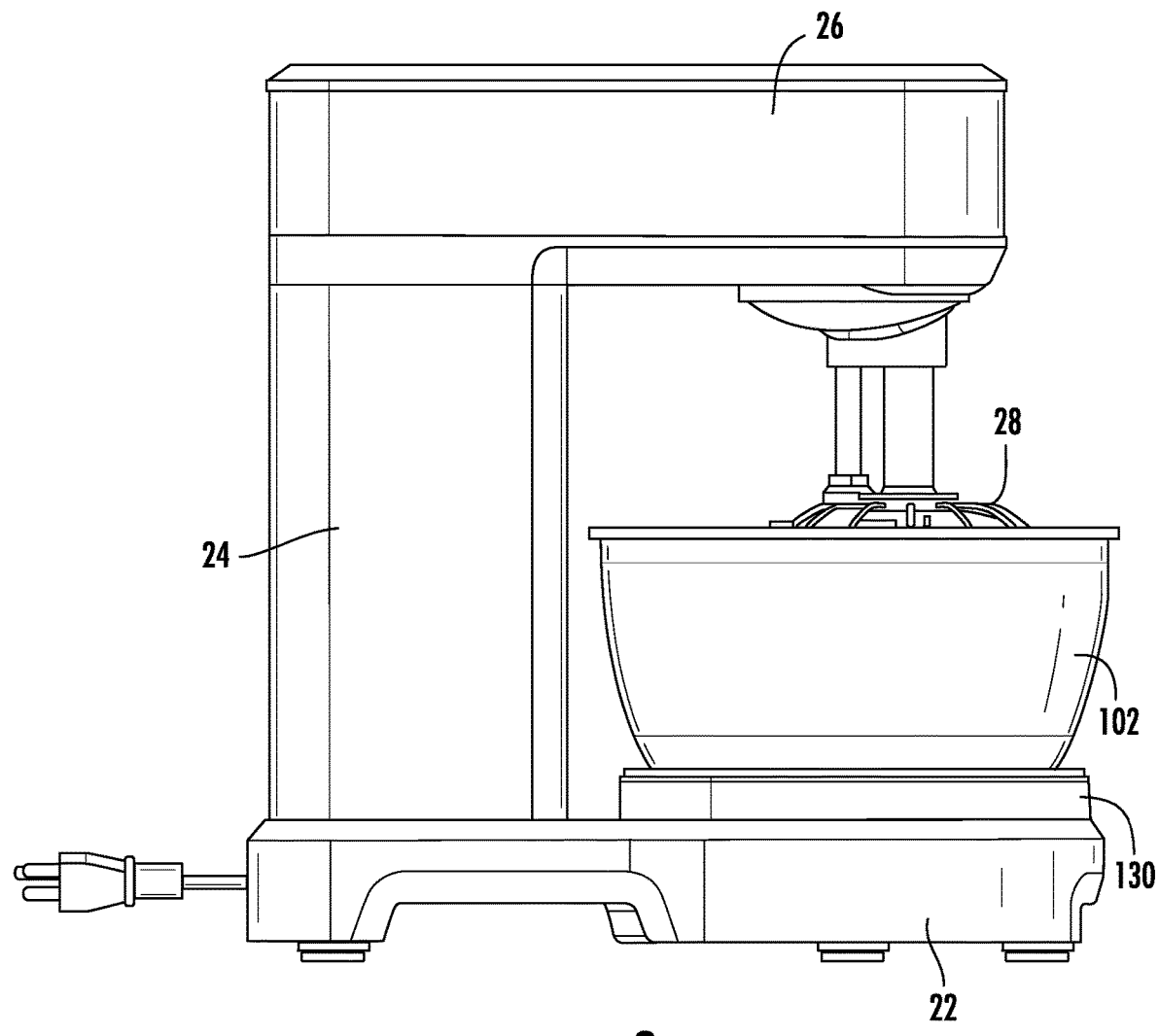
FIG. 2 is a side view of the stand mixer of FIG. 1.
Figure 3:
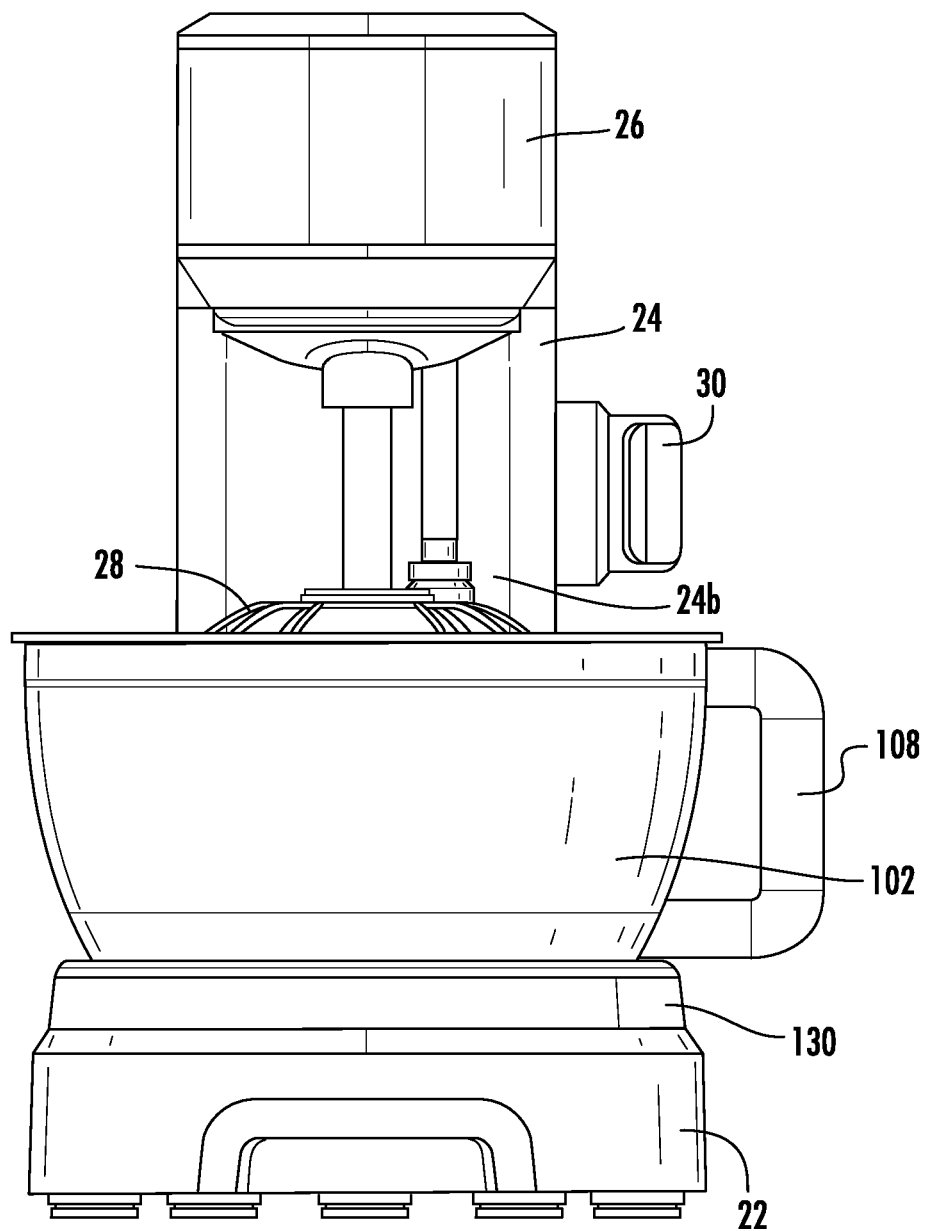
FIG. 3 is a front view of the stand mixer of FIG. 1.
Figure 4:
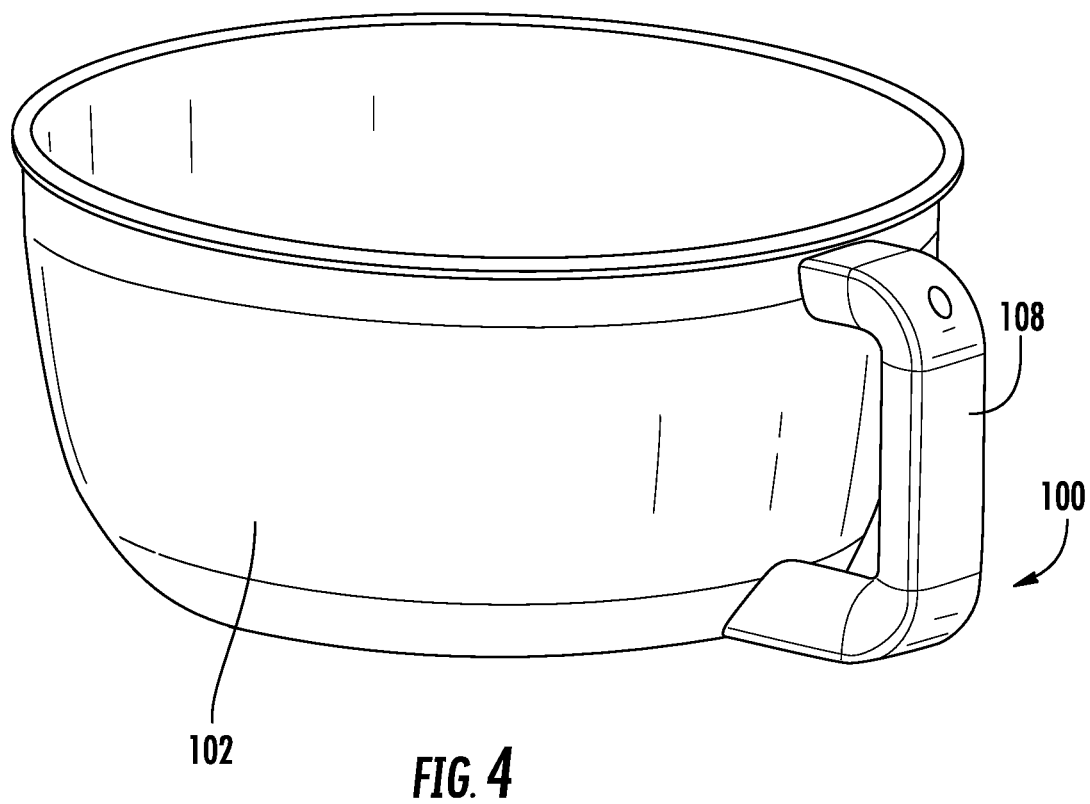
FIG. 4 is a perspective view of the bowl of the stand mixer of FIG. 1.

The present invention will now be described more fully hereinafter, in which embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees or at other orientations) and the spatially relative descriptors used herein interpreted accordingly.

Well-known functions or constructions may not be described in detail for brevity and/or clarity.

Referring now to the figures, a stand mixer according to embodiments of the disclosure is shown in FIGS. 1-13 and designated broadly at 20. The stand mixer 20 includes a base 22 that rests on an underlying surface, such as a kitchen counter, a vertical support arm 24 that extends upwardly from one end of the base 22, and a head 26 that extends generally horizontally and forwardly from the upper end of the support arm 24. (As used herein, the "forward" or "front" direction is defined by a horizontal vector extending from the support 24 toward the opposite end of the base 22. The "rear" direction is opposite the forward direction).

A pair of beaters 28 (seen best in FIGS. 2, 3 and 5) is mounted near the forward end of the head 26. The beaters 28 are connected to a motor (not shown) mounted in the head 26 via a planetary gear arrangement that enables the beaters 28 to thoroughly mix ingredients within a bowl 102 (see below) mounted on the base 22 without scraping the sides or the bottom of the bowl 102. In such an arrangement, each of the beaters 28 rotates about an axis defined by its shaft, plus the pair of beaters 28 revolves together about an axis centered over the bowl 102 (described in detail below). The planetary gear arrangement can be any of those known to those of skill in this art (see, for example, U.S. Pat. No. 5,934,802) and need not be described in detail herein.

A dial 30 that regulates the speed of the beaters 28 is mounted on one side wall 24a of the support arm 24. The dial 30 is electrically connected with the motor in a conventional manner. A power cord 32 electrically connected with the motor is routed from the rear of the base 22.

Figure 5:
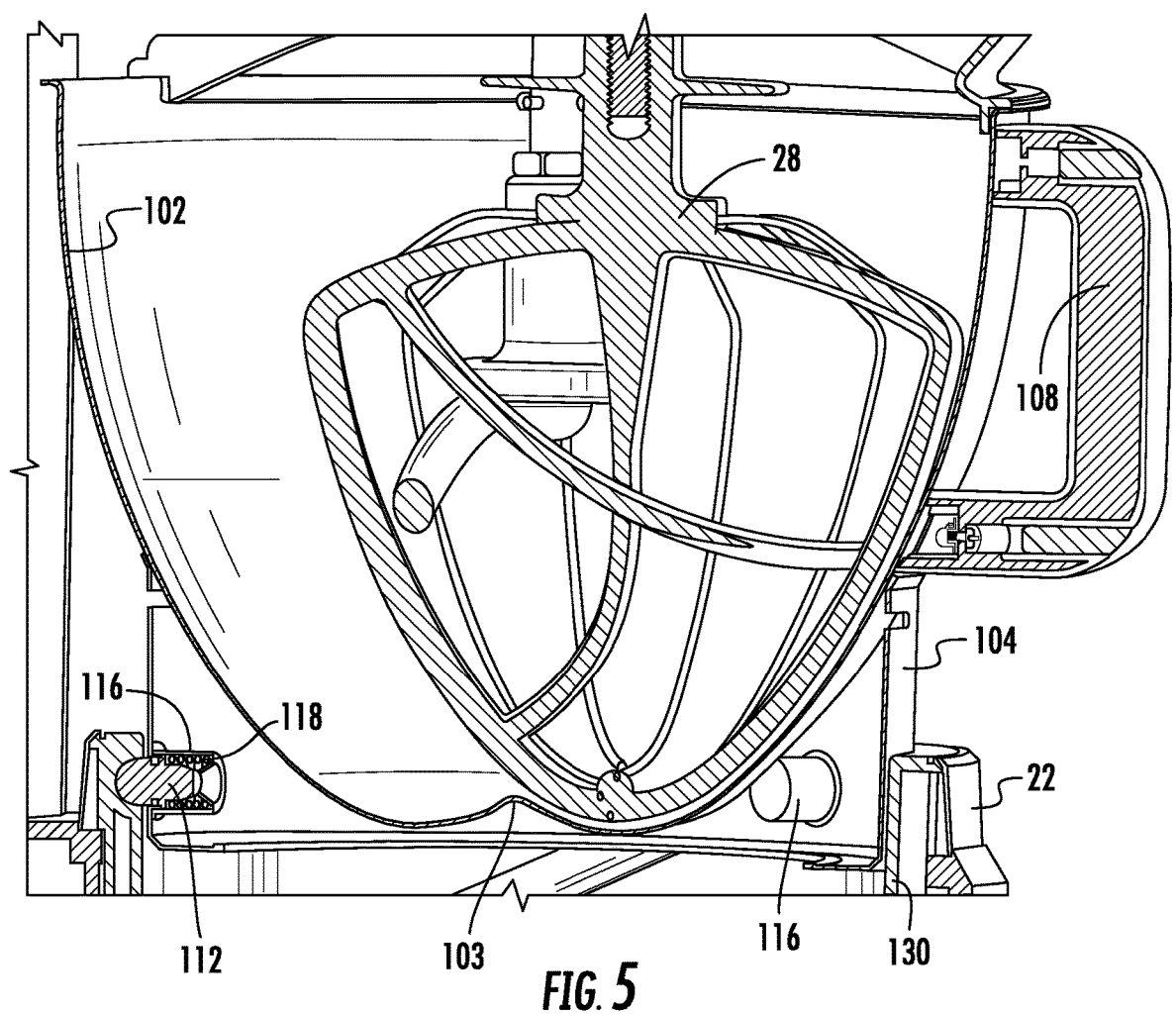
FIG. 5 is an enlarged section view of the bowl and skirt of FIG. 4 and a portion of the bowl lift framework of FIG. 8 below.

Referring now to FIGS. 4-7, a bowl assembly 100 is mounted to the base 22 beneath the beaters 28. The bowl assembly 100 includes the bowl 102 mentioned above and a skirt 104 fixed to a lower portion of the bowl 102. As can be seen in FIG. 5, the bowl 102 has a dimple 103 that protrudes upwardly from the floor 106 of the bowl 102. The dimple 103 and floor 106 are configured to compliment the shape of the lower edges of the beaters 28 to ensure that ingredients are thoroughly mixed. A single handle 108 extends radially outwardly from the side wall 110 of the bowl 102.

The skirt 104 is generally cylindrical and is of a diameter slightly less than that of the upper edge of the bowl 102. Typically the skirt 104 is a separate component from the bowl 102, but in some embodiments the bowl 102 and skirt 104 may be formed as a single unitary component. At three substantially equidistant locations about the circumference of the skirt 104, nubs 112 protrude radially outwardly from the wall of the skirt 104 from recesses 116. Each nub 112 is spring-loaded (via a spring 118) and biased radially outwardly toward the protruding position shown in FIG. 7. A flange 120 on each nub 112 maintains it within the recess 116.

Figure 6:
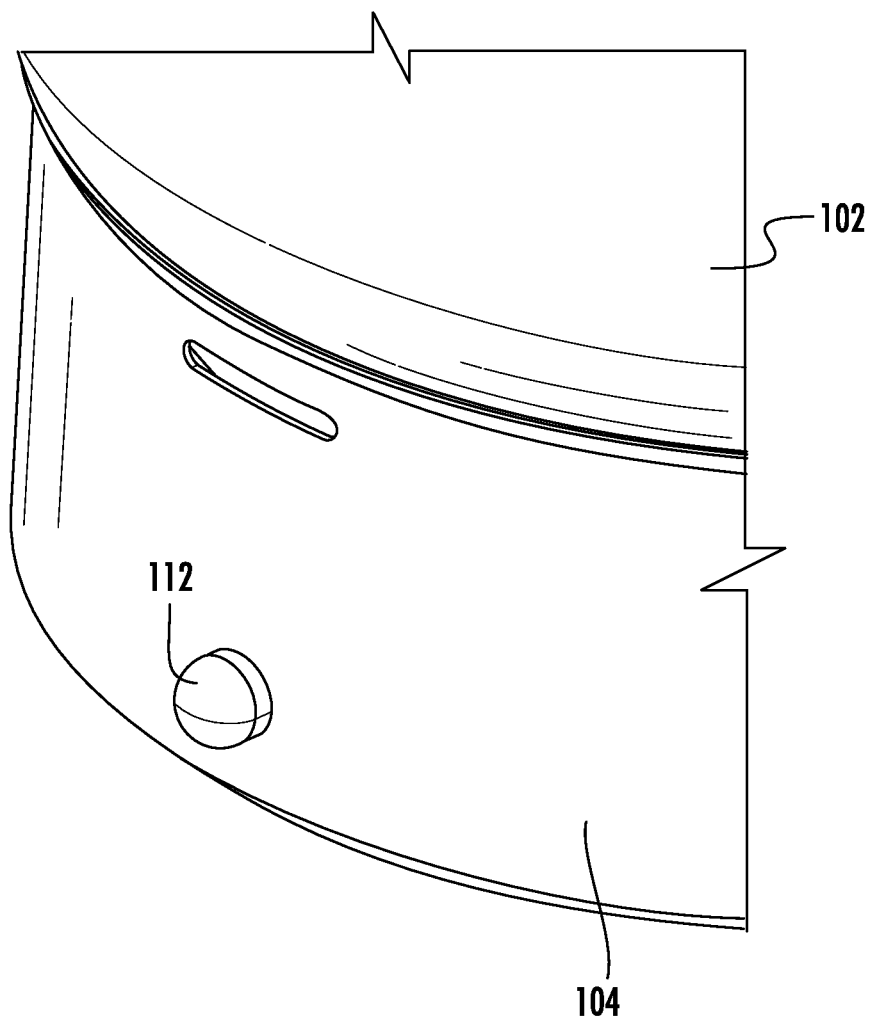
FIG. 6 is a partial, greatly enlarged view of the bowl and skirt of FIG. 4 showing a locking nub.
Figure 7:
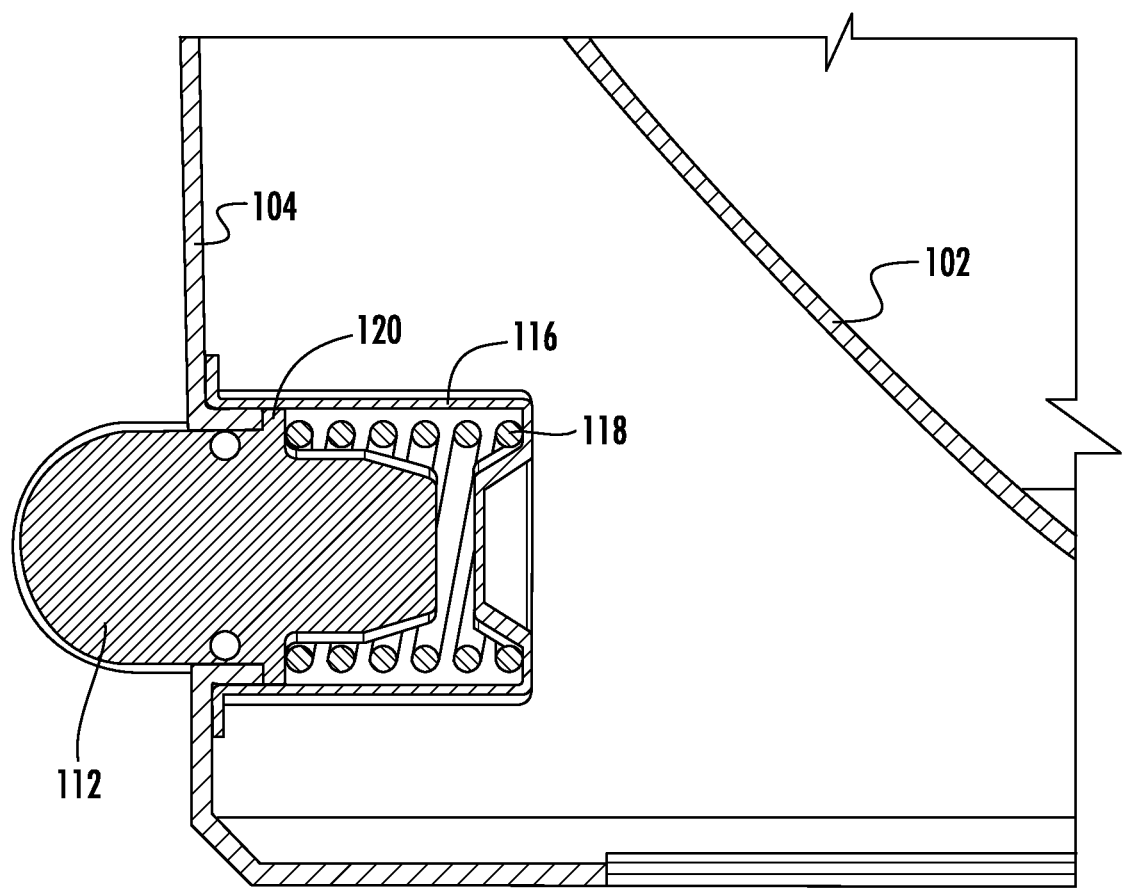
FIG. 7 is a greatly enlarged section view of the locking nub of FIG. 6.
Figure 8:
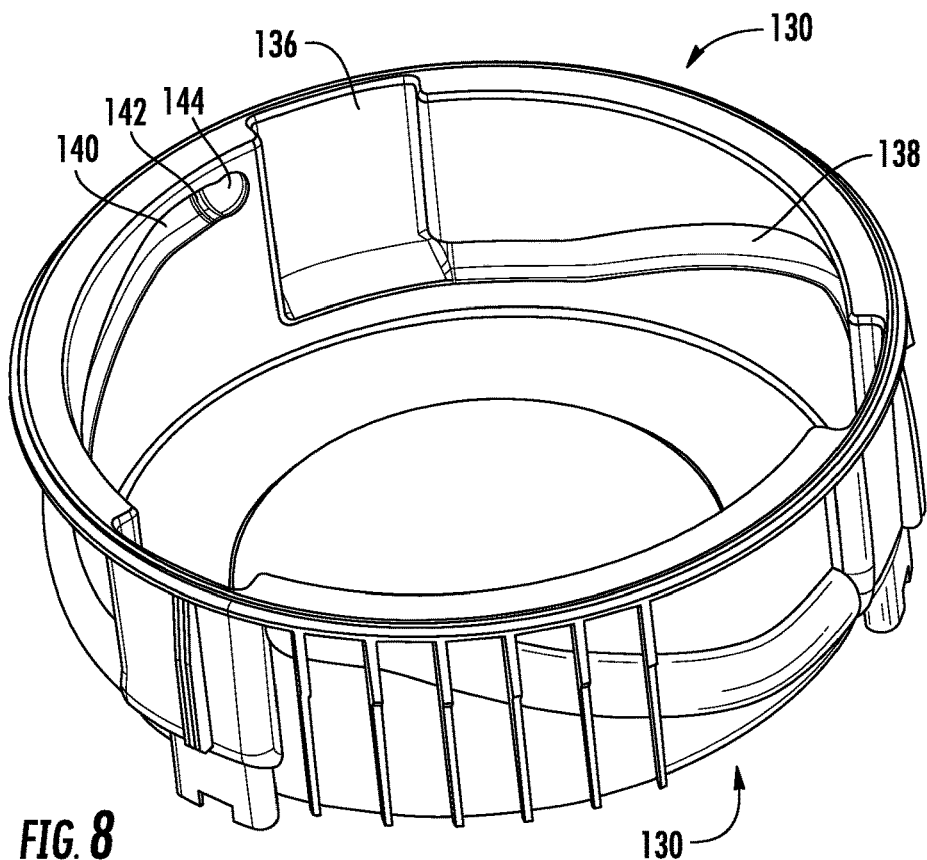
FIG. 8 is a perspective view of a bowl lift framework of the stand mixer of FIG. 1.
Figure 9:
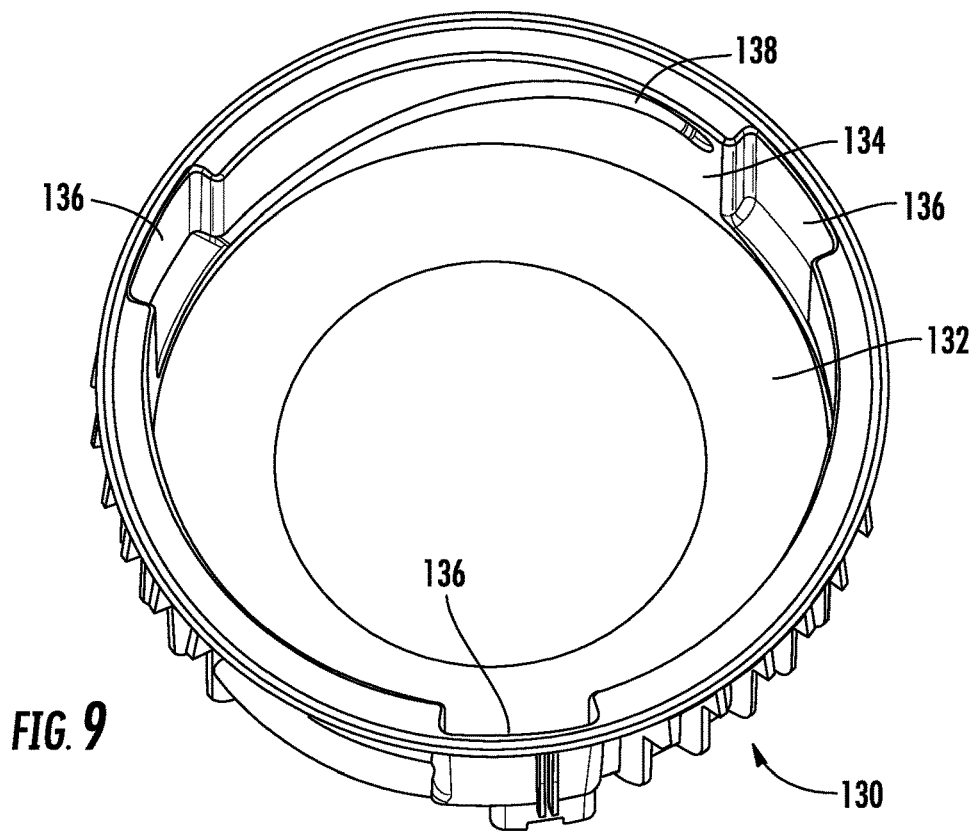
FIG. 9 is a top perspective view of the bowl lift framework of FIG. 8 showing the entry recesses for the locking nubs of the bowl and skirt of FIG. 7.
Figure 10:
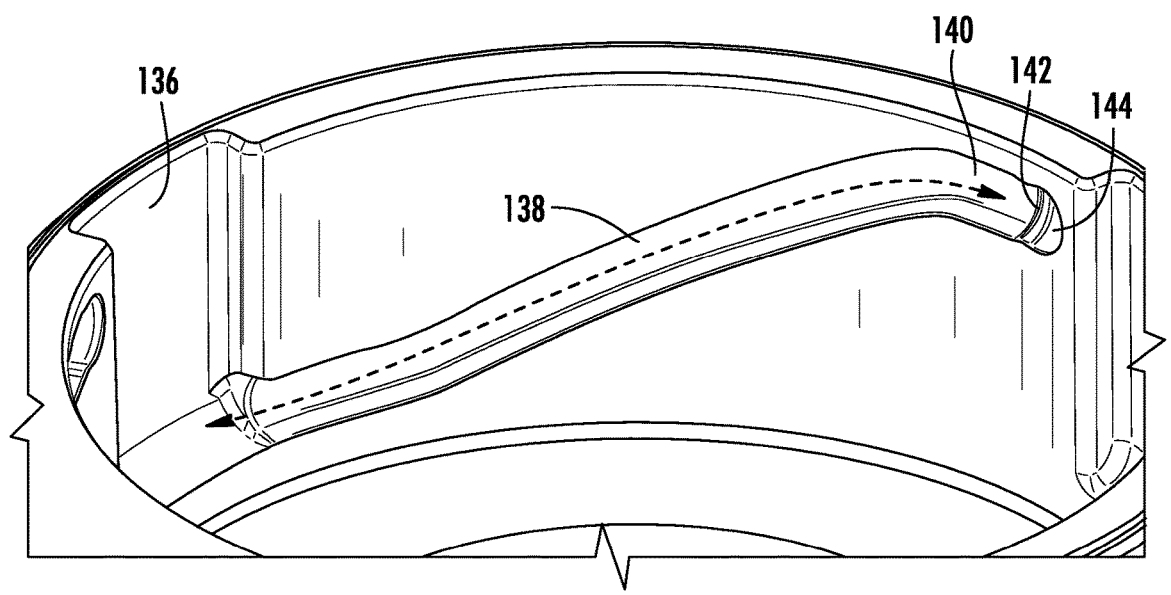
FIG. 10 is a partial, enlarged view of the bowl lift framework of FIG. 8 showing one of the lift tracks.
Figure 11:
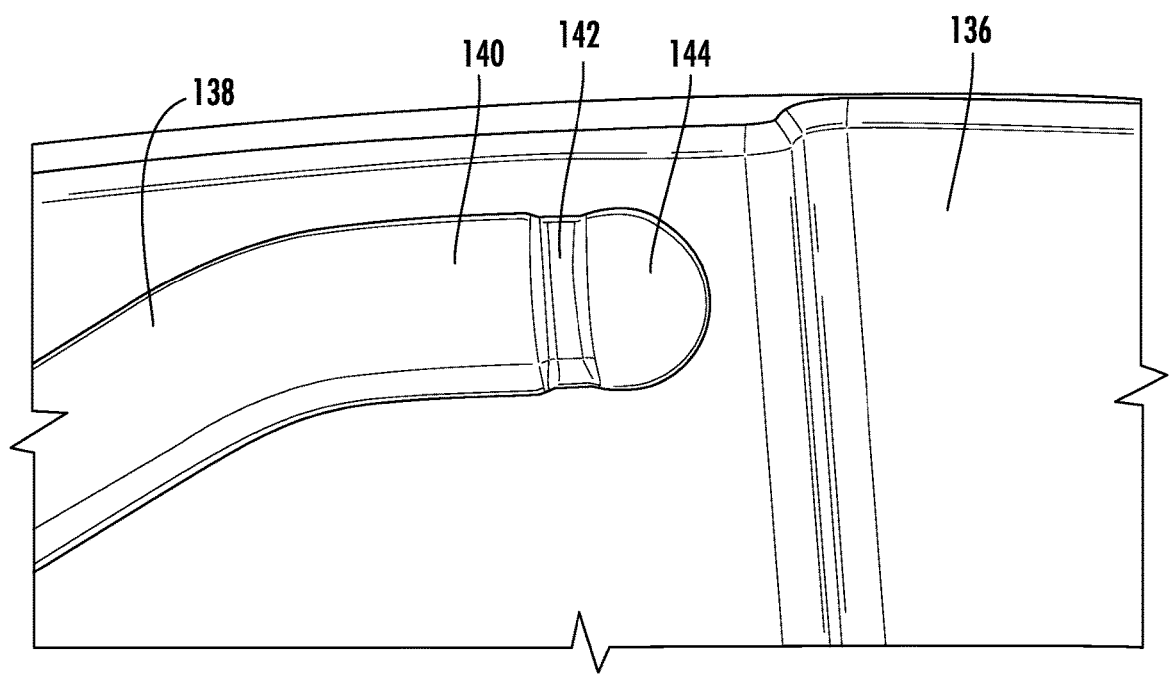
FIG. 11 is a partial, greatly enlarged view of the upper end of the lift track of FIG. 10.
Figure 12:
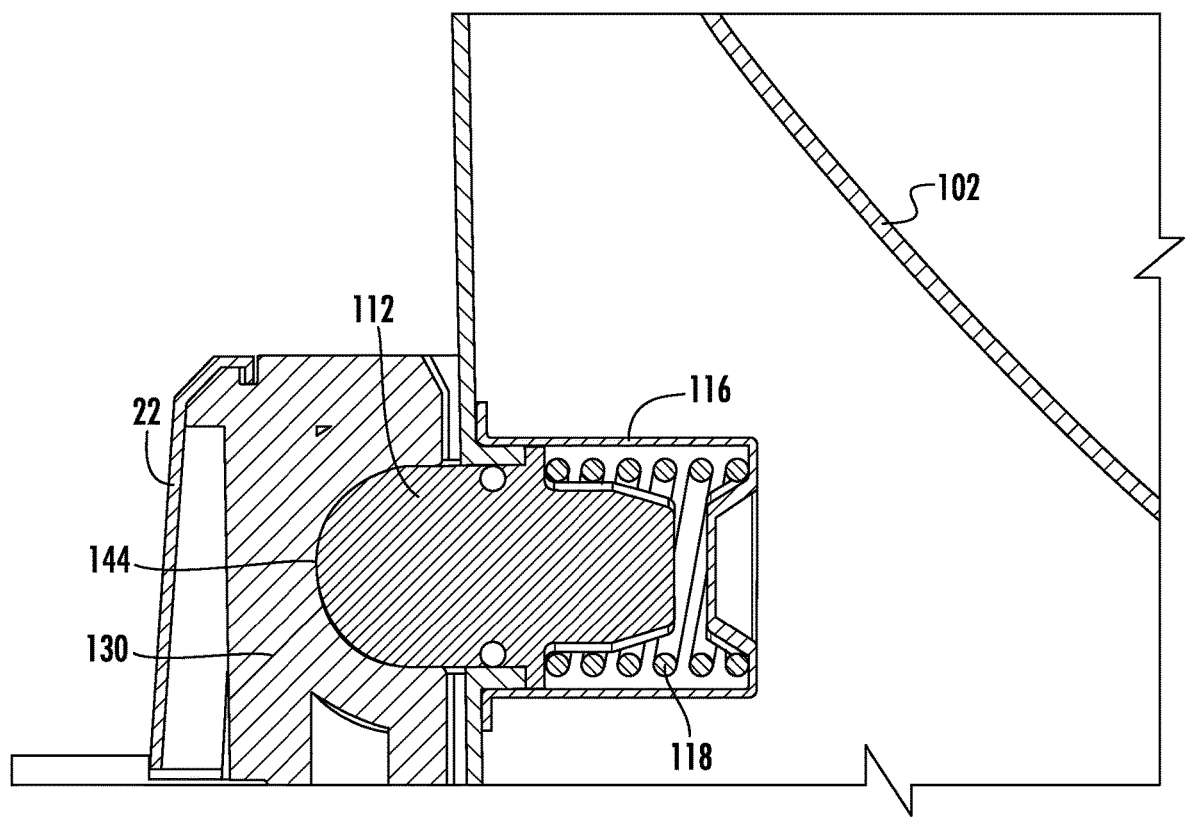
FIG. 12 is a greatly enlarged section view of the locking nub of FIG. 7 locked into the track of FIG. 10.

Referring now to FIGS. 8-11, a bowl lift framework 130 resides within the base 22. The bowl lift framework 130 is generally cylindrical, with a floor 132, a vertical wall 134 and an open upper end. The wall 134 includes three circumferentially equidistantly spaced recesses 136. A partially helical track 138 is contiguous with the lower end of each recess 136 and is routed therefrom toward the upper end of an adjacent recess 136. The upper end of each track 138 includes a flat segment 140 that approaches, but does not reach, the adjacent recess 136. As shown in FIG. 6, the flat segment 140 of each track 138 has a shallow ridge 142 that separates a pocket 144 at the closed end of the flat segment 140 from the remainder of the track 138. The bowl lift framework 130 is illustrated as a separate component from the base 22, but in some embodiments the bowl lift framework 130 may be integrated into or otherwise formed within the base 22.

Figure 13:
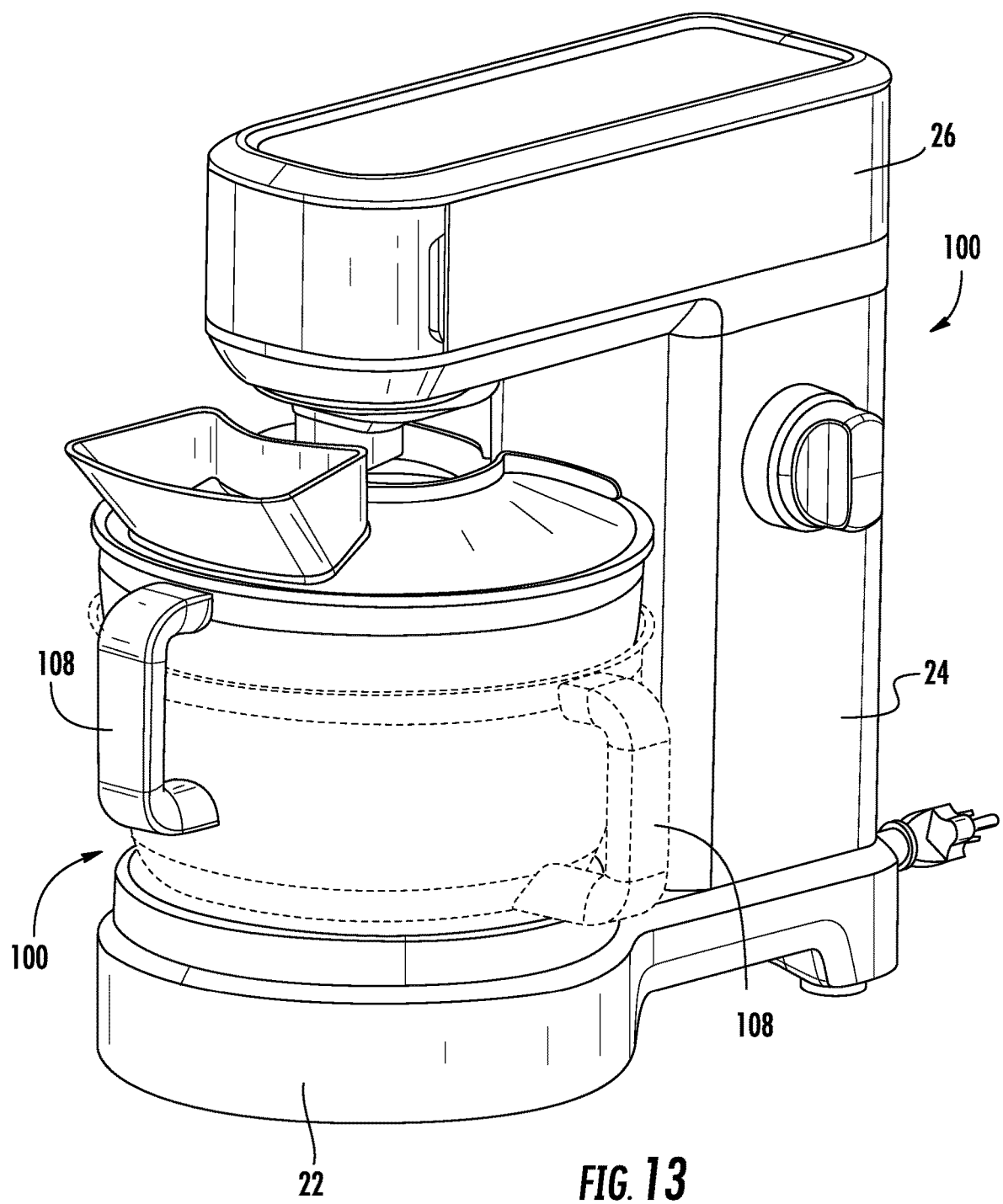
FIG. 13 is a perspective view of the stand mixer of FIG. 1 showing the bowl in a lowered position (in broken line) and a raised position (in solid line).

In operation, the bowl assembly 100 is typically in a lowered position as shown in FIG. 1 and in broken line in FIG. 13. In this position, the bowl 102 and skirt 104 are rotated such that each of the nubs 112 is positioned at or near the lowest point of its corresponding track 138. The protruding nubs 112 maintain the bowl assembly in the tracks 138, and the radially-outward biasing of the nubs 112 provides pressure against the tracks 138 to maintain the bowl assembly 100 in this position. The handle 108 is located on the right side of the bowl 102 (when viewed from the front of the stand mixer 20). The lowered position of the bowl assembly 100 would typically be used when ingredients are being added to the bowl 102, or when the stand mixer 20 is stored or otherwise not in use.

When an operator wishes to operate the stand mixer 20, the bowl assembly 104 can be elevated to a raised position by pulling the handle 108 toward the front and center of the stand mixer 20. Such a force on the handle 108 rotates the bowl assembly 100 relative to the base 22, and in particular relative to the bowl lift framework 130 (rotation is clockwise when viewed from above). As the bowl assembly 100 rotates, the nubs 112 slide within the tracks 138, which forces the skirt 104 and bowl 102 upwardly. Upward movement of the bowl assembly 100 essentially ceases when the nubs 112 reach the flat segments 140 of the tracks 138. Continued rotation causes the nubs 112 to contact the ridges 142, at which point the nubs 112 retract radially inwardly slightly to clear the ridges 142, and further rotation drives the each of the nubs 112 into a respective pocket 144 (see FIG. 12). The radially-outward biasing of the nubs 112 by the springs 118 maintains the nubs 112 in the pockets 144, which in turn prevents the bowl assembly 100 from rotating in the reverse direction (i.e., counterclockwise when viewed from above) absent a purposeful force applied by the operator. Complete lifting (shown in FIG. 13 in solid line) typically entails rotation of the bowl assembly 100 between about 80-100 degrees.

Once the bowl assembly 100 is in the raised position, the stand mixer 20 can be operated in a conventional manner. Notably, in some embodiments the rotational direction of the beaters 28 is the same as the rotative direction that the bowl assembly follows (e.g., both are clockwise); thus, forces on the bowl assembly 100 from the action of the beaters 28 on ingredients in the bowl 102 tend to force the nubs 112 toward the closed ends of the pockets 144 and away from the ridges 142, which action helps to maintain the bowl assembly 100 in the raised position.

When mixing is complete, the bowl assembly 100 can be lowered to the lowered position by forcing the handle 108 in the opposite direction (i.e., counterclockwise when viewed from above). This action forces the nubs 112 over the ridges 142, then along the tracks 138 until the nubs 112 reach the recesses 136. Once the nubs 112 reach the recesses 136, the bowl assembly 100 can be lifted off of the bowl lift framework 130 for emptying, cleaning, etc.

A bowl lift configured in this manner may provide performance and aesthetic advantages. Because there are no rails or other features on the front side wall 24*b* of the support arm 24, the front side wall 24*b* can present a smooth surface, which facilitates cleaning significantly compared to stand mixers with rails or the like mounted to this surface. The smooth surface may also provide the stand mixer 20 with a sleeker, more appealing appearance.

In this embodiment, the bowl assembly 100 rises between about 1.5 and 2.5 inches, which provides sufficient space to easily remove the bowl assembly 100 when it is in the lowered position, but locates the bowl 102 at the correct height when the bowl assembly 100 is in the raised position. However, in other embodiments the elevation change of the bowl assembly 100 may vary. Also, typically each of the tracks 138 defines an arc of between about 80 and 100 degrees (with about 90 degrees being the arc length in the illustrated embodiment), although this arc length may vary in other embodiments, particularly if more (e.g., four) or fewer (e.g., two) tracks 138 and accompanying recesses 136 are included. Moreover, in some embodiments the tracks may be "stepped", rather than smoothly changing elevation; for example, a track may have a horizontal lower segment routed from an adjacent recess 136, a steeply angled (or even vertical) segment that raises the bowl assembly 100, and a horizontal upper segment in which the bowl assembly 100 locks in place in the raised position. As a further example, the tracks 138 may be routed such that rotation of the bowl assembly 100 in the opposite direction (i.e., counterclockwise when viewed from above) causes the bowl assembly 100 to rise.

Figure 14:
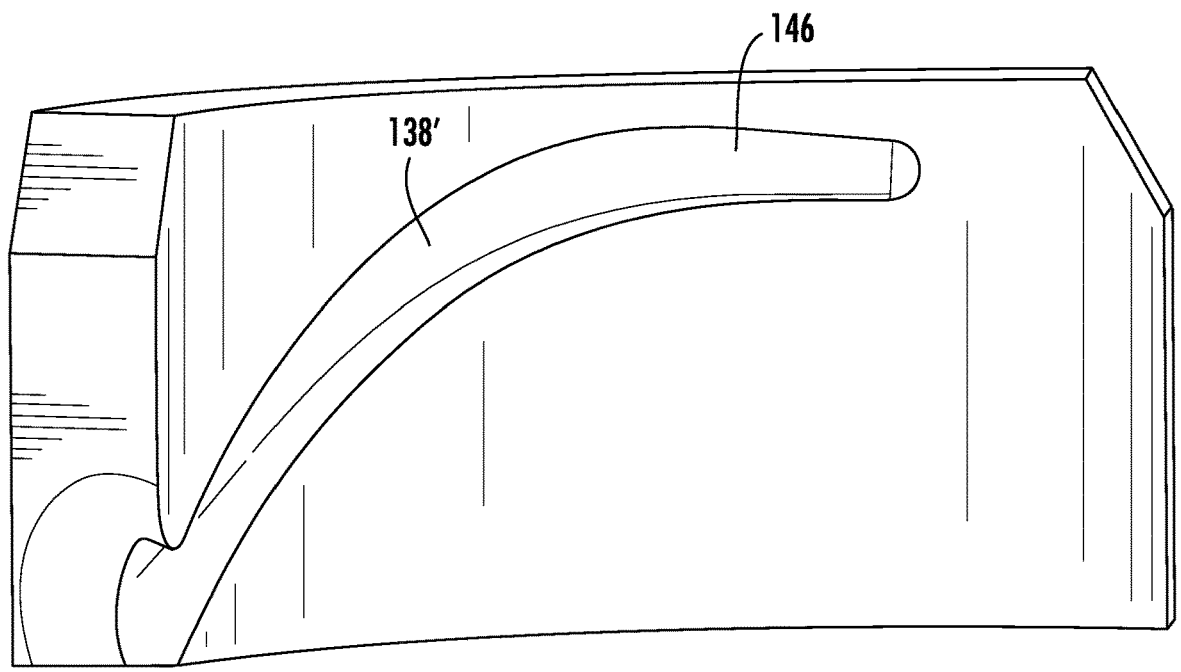
FIG. 14 is an enlarged perspective view of a track in a bowl lift framework according to embodiments of the disclosure.
Figure 15:
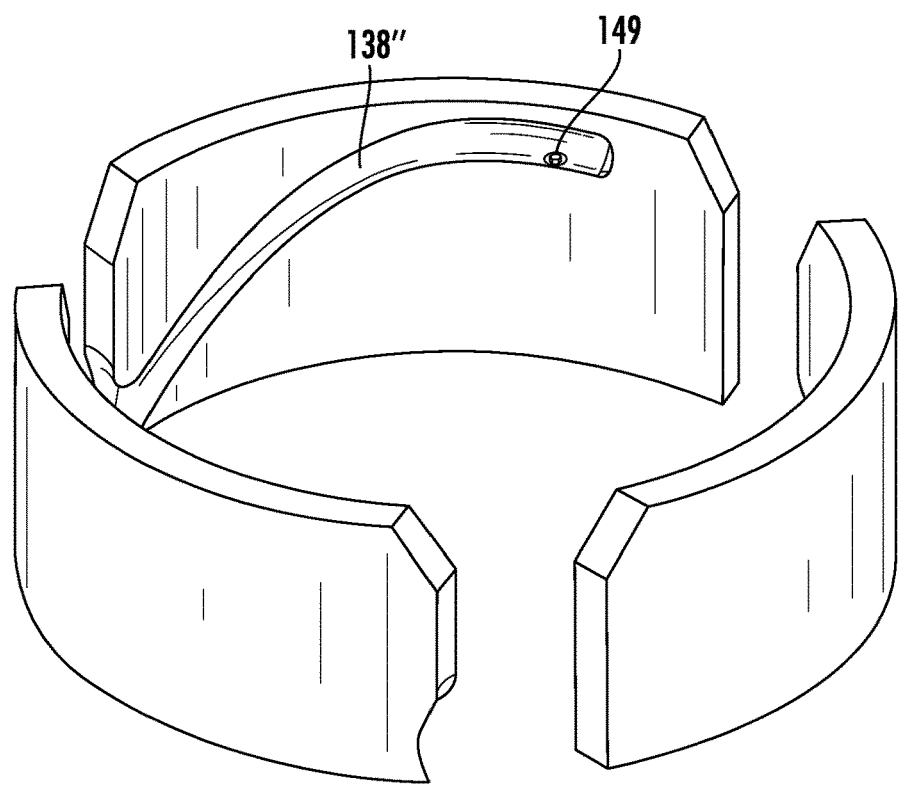
FIG. 15 is a perspective view of a bowl lift framework according to further embodiments of the disclosure.

Structures for maintaining the bowl in the lifted position may also vary. For example, rather than a ridge 142 and a pocket 144 located at the upper end of the track 138, a track (shown in FIG. 14 at 138') with a tapered upper end 146 may be employed. In such a configuration, the nubs 112, which would not require spring-loading, wedge into place in the tapered end 146 and are maintained in position via friction. The track 138' may be tapered in width, depth or both. An alternative to this concept, shown in FIG. 15, employs a detent 149 in the track 138" (rather than a ridge 142) to maintain the nub 112 in place.

Figure 16:
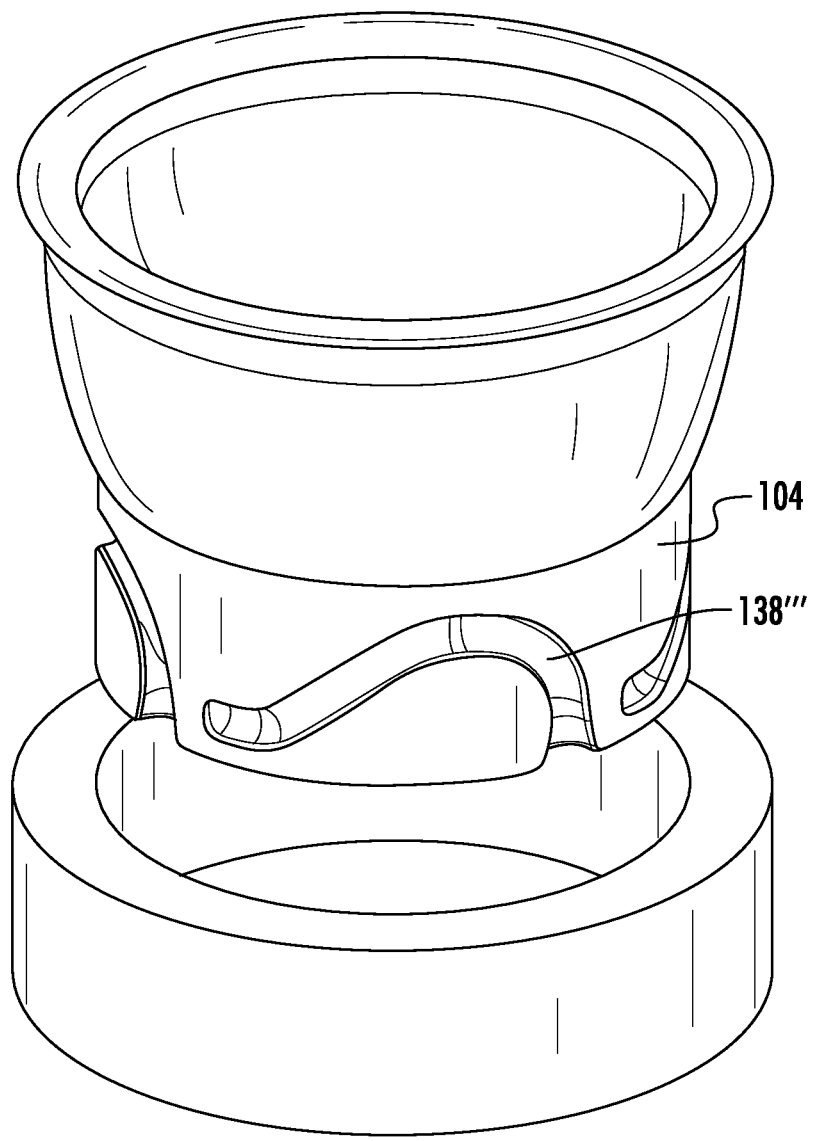
FIG. 16 is a perspective view of a bowl assembly and bowl lift framework according to still further embodiments of the disclosure.
Figure 17:
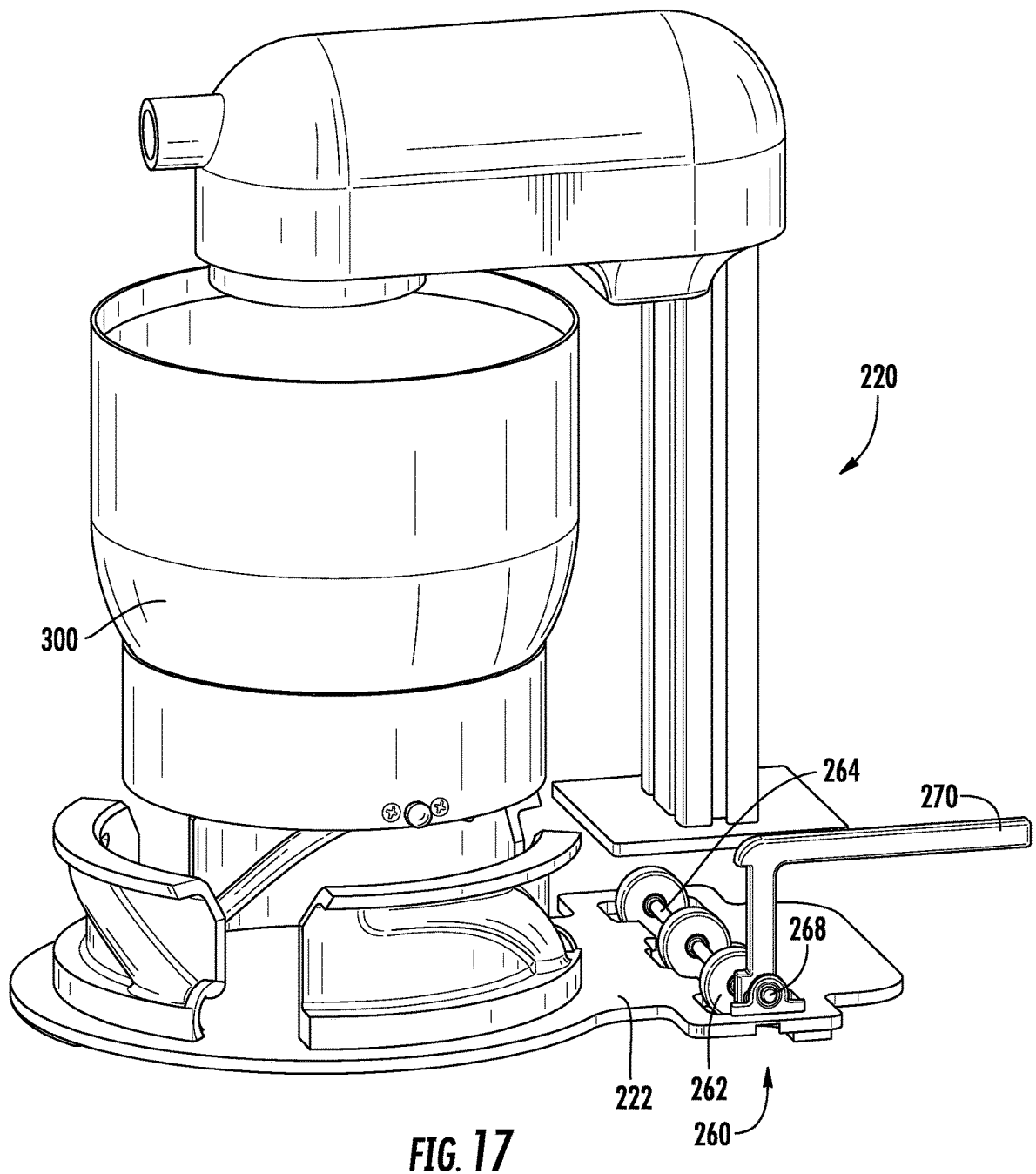
FIG. 17 is a side view of a stand mixer according to alternative embodiments of the disclosure, the stand mixer including a retractable wheel mechanism shown in the raised position.
Figure 18:
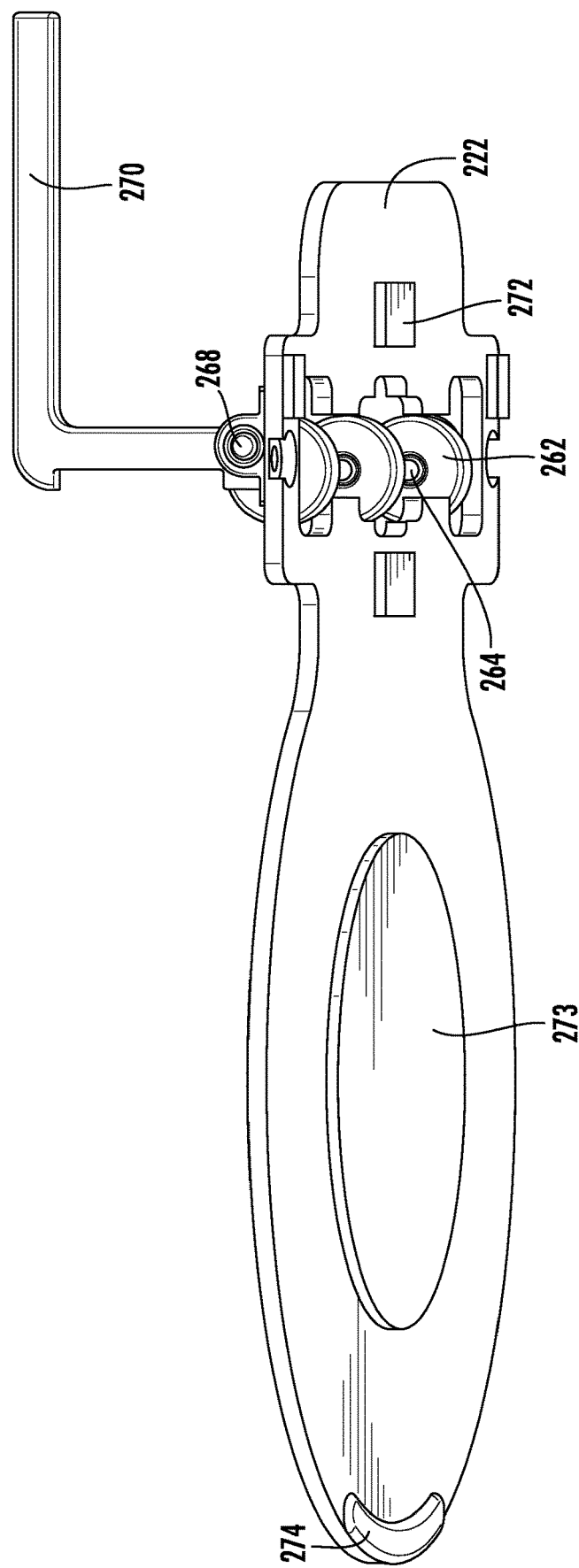
FIG. 18 is an enlarged side perspective view of the retractable wheel mechanism of FIG. 17 shown in the retracted position.
Figure 19:
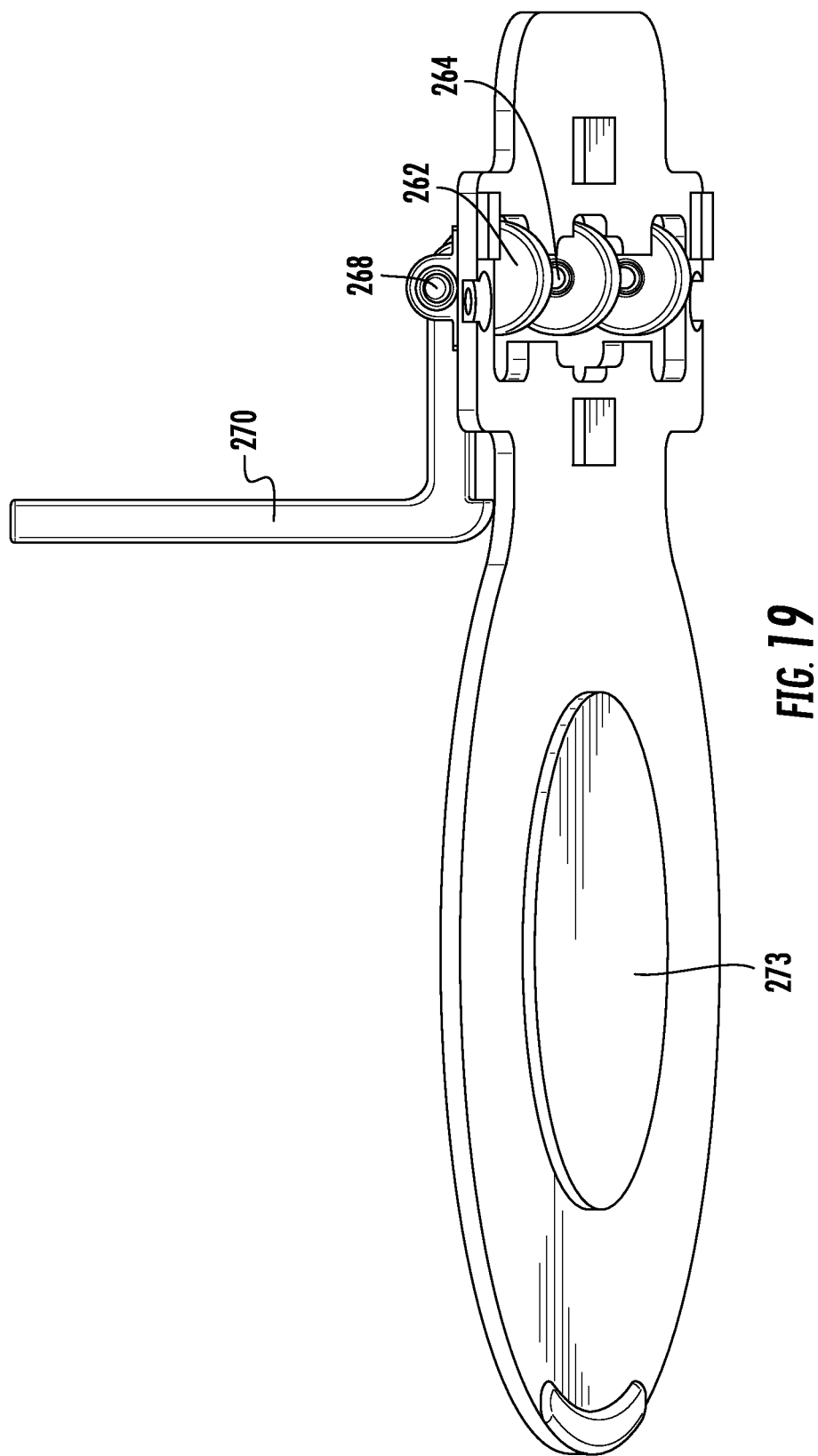
FIG. 19 is an enlarged side perspective view of the retractable wheel mechanism of FIG. 17 shown in the lowered position.
Figure 20:
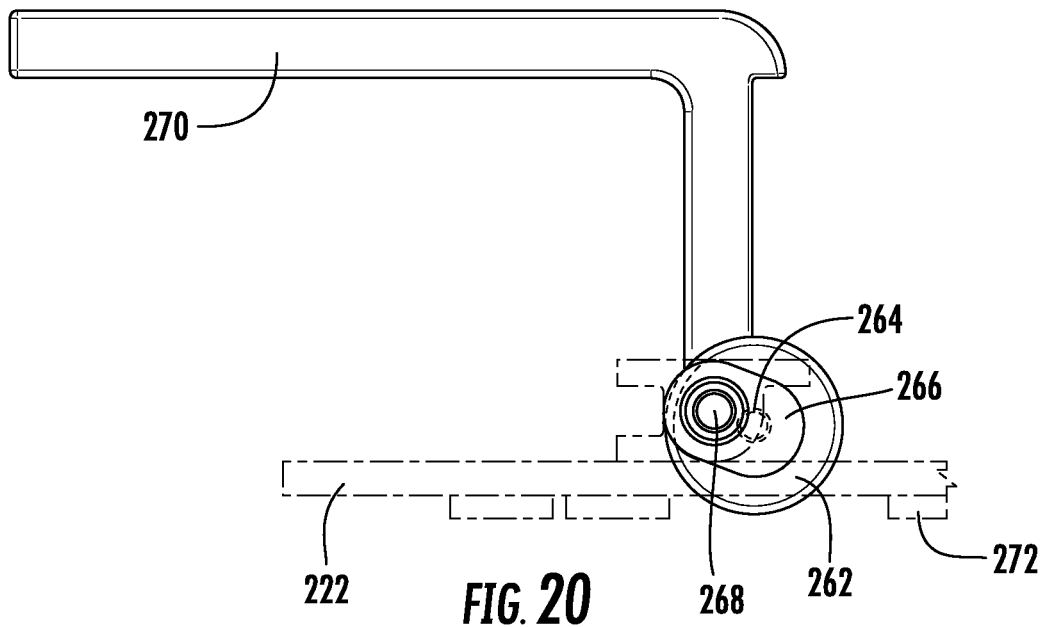
FIG. 20 is an enlarged opposite side perspective view of the retractable wheel mechanism of FIG. 17 shown in the raised position.
Figure 21:
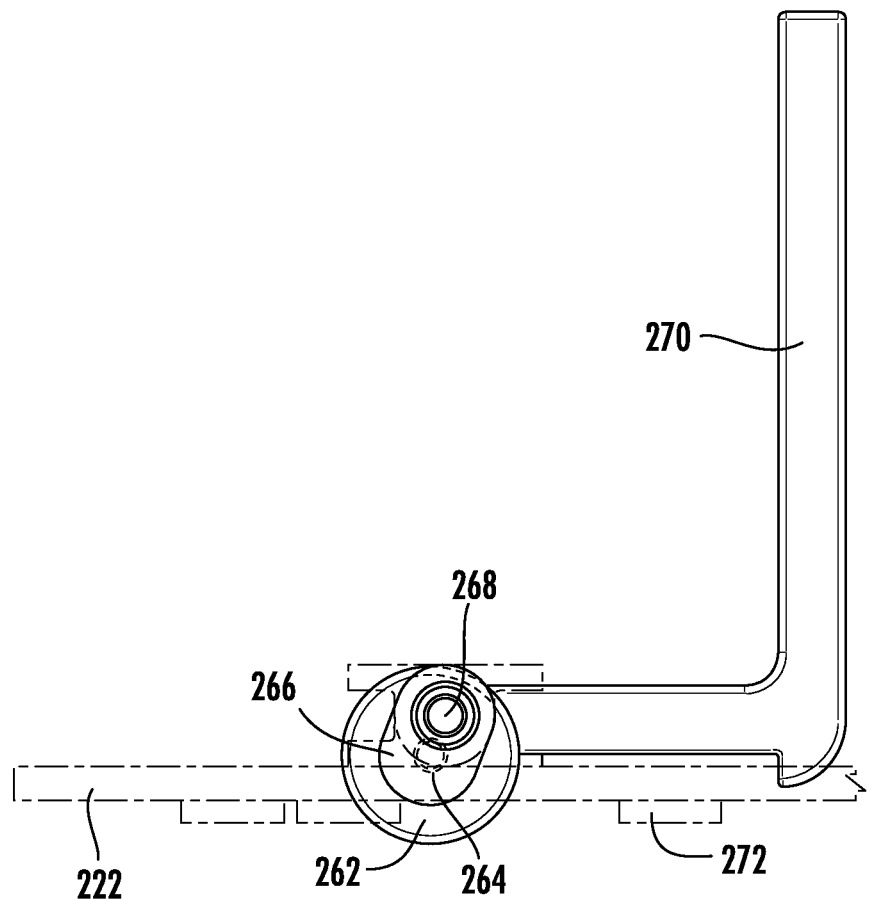
FIG. 21 is an enlarged opposite side perspective view of the retractable wheel mechanism of FIG. 17 shown in the lowered position.

The features in the bowl assembly 100 and the bowl lift framework 130 may also take different forms. As an example, the nubs 112 may be mounted on the bowl lift housing 130, and tracks 138" may be included in the skirt 104 (see FIG. 16). As an additional example, the tracks 138 may take the form of an inwardly-projecting channel with side walls, rather than being recessed into the wall of the bowl lift framework 130, or may simply comprise a ramp with no upper surface to confine the nubs 112. Other variations may also be employed.

It is also notable that the single handle 108 and the approximate 90 degree rotation of the bowl assembly 100 during elevation of the bowl assembly 100 can enable the bowl assembly 100 to be easily raised with either hand. A right-handed user typically places the bowl assembly 100 into the bowl lift housing 130 with the handle 108 extending to the right as seen in FIG. 13, then moves the handle 108 with his/her right hand (and in turn rotating the bowl assembly 100) to a position in front of the base 22. A left-handed user typically places the bowl assembly 100 into the bowl lift housing 130 with the handle 130 facing forwardly, and uses his/her left hand on the handle 108 to rotate the bowl assembly 100 to a position in which the handle 108 extends to the left. Thus, a single handle 108 can be used to provide an "ambidextrous" lifting technique.

Referring now to FIGS. 17-21, another embodiment of a stand mixer, designated broadly at 220, is shown therein. Stand mixers are often heavy, and therefore may be difficult to move around on a kitchen counter. Wheels on the base of a stand mixer have been proposed (see U.S. Patent Publication No. 2005/0058018), but such mixers may have a tendency to move in operation; the mixer may "walk" undesirably along the counter due to vibration caused by as the beater rotation.

The stand mixer 220 can address this issue. As shown in FIGS. 17-21, the stand mixer 220 includes a wheel lowering mechanism 260. The wheel lowering mechanism 260 includes three wheels 262 mounted on an axle 264. The axle 264 is fixed on each end to a cam 266 (seen best in FIGS. 20 and 21) that is pivotally mounted toward the rear of the base 222 of the stand mixer 220 via a pivot pin 268. An L-shaped handle 270 extends upwardly, then rearwardly from one of the cams 266. Feet 272 are mounted to the underside of the base 222 near the wheel mechanism 260, and a contact pad 273 is mounted beneath the bowl assembly 300. Also, a low-friction pad 274 is mounted near the front end of the base 222.

The weight of the stand mixer 220 is applied to the mechanism 260 through the pivot pin 268. In the raised position of FIGS. 17, 18 and 20, the axle 264 is positioned forwardly of the pivot pin 268. As such, the weight of the mixer 220 on the pivot pin 268 tends to force the axle 264, and thus the wheels 262, upwardly, to a height above the lower surfaces of the feet 272 and the contact pad 273. Thus, the feet 272 and the contact pad 273 extend downwardly from the base 222 farther than the wheels 262 when the wheels are in the raised position, with the result that the feet 272 and the contact pad 273 contact the underlying surface (e.g., a countertop) and provide a stable foundation for the stand mixer 220. Also, the low-friction pad 274 extends downwardly so that its lower surface is just above the countertop when the wheels 262 are in the raised position.

The wheels 262 can be moved to a lowered position (FIGS. 19 and 21) by pulling the handle 270 upwardly and forwardly. This action pivots the cams 266 about the pivot pin 268, which in turn rotates the axle 264 and wheels 262 downwardly and rearwardly. This movement extends the wheels 262 so that they extend below the feet 272. Also, once the axle 264 travels rearwardly of the pivot pin 268, the weight of the stand mixer 220 on the pivot pin 268 encourages the cam 266 counterclockwise from the vantage point of FIG. 19, which urges the wheels 262 to remain in the lowered position. In addition, the lowering of the wheels 262 also causes the stand mixer 220 to tip forwardly slightly. This forward tilting action, which occurs because the wheels 262 are positioned rearward of the center of gravity of the mixer 220, tips the forward end of the base 222 sufficiently that the low-friction pad 274, rather than the feet 272, contacts the underlying surface. Thus, the stand mixer 220 is supported by the wheels 262 and the low-friction pad 274, which enables the mixer 220 to move easily moved on the underlying surface, rolling on the wheels 262 and sliding on the low friction pad 274.

Those of skill in this art will appreciate that other mechanisms for lowering the wheels may be employed. For example, as shown in FIG. 22, one or more wheels (in the form of a ball bearing 262') may be mounted below the lower end of a threaded shaft 280, the upper end of which is attached to a dial or knob 282. Rotation of the dial/knob within a threaded bore 284 can raise and lower the ball bearing 262'. Other configurations for raising and lowering wheels may also be employed.

Also, the low-friction pad 274 may be replaced or supplemented with other components that reduce friction or encourage movement, such as one or more wheels, ball bearings, rollers, or the like, or even a downwardly-extending projection from the base 222 with a rounded end, edge or the like.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A stand mixer, comprising:
a base, the base including a bowl lift framework having first lift features;
a support arm attached to the base and extending upwardly therefrom;
a head attached to an upper end of the support arm and extending generally horizontally therefrom above the base; and
a bowl assembly comprising a bowl and a skirt mounted to the bowl, the skirt including second lift features;
wherein the first lift features interact with the second lift features such that, when the bowl assembly is rotated relative to the bowl lift framework, the bowl assembly changes elevation relative to the base between raised and lowered positions.

2. The stand mixer defined in claim 1, wherein the first features comprise one of a plurality of projecting nubs and a plurality of partially helical tracks, and the second features comprise the other of a plurality of projecting nubs and a plurality of partially helical tracks.

3. The stand mixer defined in claim 2, wherein the first features comprise a plurality of partially helical tracks, and the second features comprise a plurality of radially-outwardly projecting nubs.

4. The stand mixer defined in claim 3, wherein at least one of the projecting nubs is spring-loaded and biased toward a radially-outward extended position.

5. The stand mixer defined in claim 3, wherein at least one of the partially helical tracks includes a pocket at an upper end thereof configured to retain one of the projecting nubs therein.

6. The stand mixer defined in claim 3, wherein the plurality of partially helical tracks is three helical tracks.

7. The stand mixer defined in claim 6, wherein each of the partially helical tracks extends circumferentially over an arc length of between about 80 and 100 degrees.

8. The stand mixer defined in claim 3, wherein a respective recess is contiguous with a lower end of each partially helical track.

9. The stand mixer defined in claim 3, wherein an upper end of each of the partially helical tracks is tapered.

10. The stand mixer defined in claim 1, wherein the bowl includes a single handle.

11. The stand mixer defined in claim 10, wherein rotation of the bowl between about 80 and 100 degrees moves the bowl between the raised and lowered positions.

12. The stand mixer defined in claim 1, further comprising beaters rotatably mounted to the head and extending downwardly into the bowl.

13. The stand mixer defined in claim 12, wherein the beaters are configured to rotate relative to the bowl in a first rotative direction, and wherein the bowl rises from the lowered position to the raised position when rotated in the first rotative direction.

14. A method of raising a bowl of a stand mixer, comprising:
providing a stand mixer having a base, a support arm attached to the base and extending upwardly therefrom, a head attached to an upper end of the support arm and extending generally horizontally therefrom above the base, beaters mounted on the head and extending downwardly therefrom, and a bowl mounted in the base below the beaters; and
rotating the bowl relative to the base, wherein features of the bowl interact with features of the base to cause the bowl to change in elevation relative to the base upon such rotation.

* * * * *